Aug. 12, 1969 C. PHILIPP 3,460,415
PROCESS AND DEVICE FOR MAKING STATOR AND ROTOR PLATES FOR
ELECTROMOTORS OF LIMITED SIZE
Filed Nov. 12, 1965 3 Sheets-Sheet 1

INVENTOR
CHRISTIAN PHILIPP
BY
ATTORNEY.

Aug. 12, 1969                    C. PHILIPP                    3,460,415
       PROCESS AND DEVICE FOR MAKING STATOR AND ROTOR PLATES FOR
                    ELECTROMOTORS OF LIMITED SIZE
Filed Nov. 12, 1965                                     3 Sheets-Sheet 2
FIG. 3.
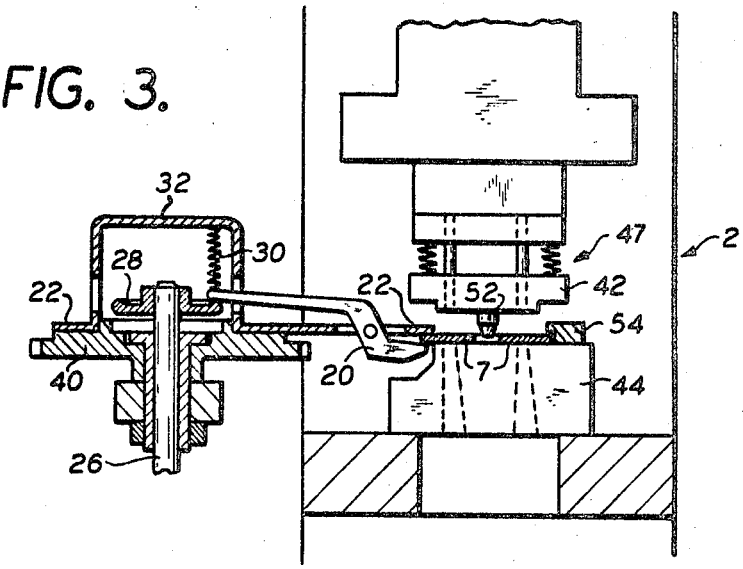
FIG. 6a.                        FIG. 6b.
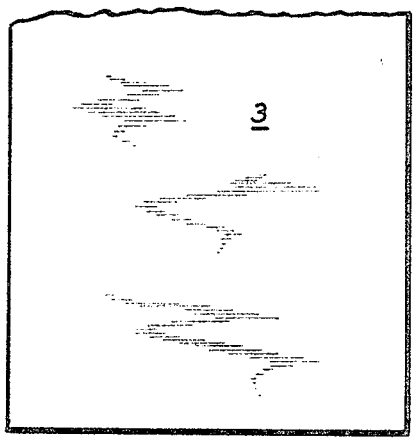            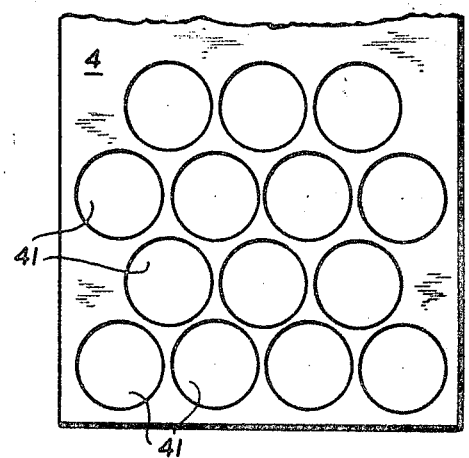
FIG. 6c.   FIG. 6d.   FIG. 6e.              FIG. 6f.
 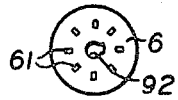    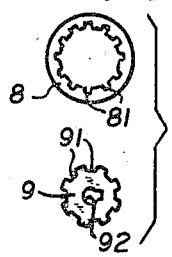
                                        INVENTOR
                                  CHRISTIAN PHILIPP
                                BY
                                              ATTORNEY.

INVENTOR
CHRISTIAN PHILIPP
BY
ATTORNEY.

3,460,415
PROCESS AND DEVICE FOR MAKING STATOR AND ROTOR PLATES FOR ELECTROMOTORS OF LIMITED SIZE
Christian Philipp, Dresden, Germany, assignor to VEB Elektromaschinenbau Sachsenwerk, Dresden-Niedersedlitz, Germany
Filed Nov. 12, 1965, Ser. No. 507,438
Int. Cl. B26d 5/20, 7/06
U.S. Cl. 83—27        14 Claims

ABSTRACT OF THE DISCLOSURE

Process and device for making stator and rotor plates for small electric motors, wherein the starting workpieces are punched out, preferably in a staggered cutting system, to final outer dimensions of the stator plates, the workpieces being fed along a circular path to simultaneously operated punching units disposed about a transporting turret having a number of individually pivotable grippers for the starting and the intermediate plates. Simultaneously but at different punching stations, notches and apertures are cut out for both kinds of plates, preferably together with a central aperture serving for the centering of the intermediate plates.

The intermediate plates are subsequently separated, preferably along a common demarcation line contiguous with the respective notches in the stator and rotor plates, and separately stacked.

The present invention relates to a process and a device for making stator and rotor plates of electromotors of limited size. More particularly, the individual workpieces from which the plates are made, are stamped or cut out in a staggered set-up, and subsequently the workpieces are automatically transported in a predetermined operating rhythm.

Stator and rotor plates are required in the electrical motor industry in substantial quantities. It is well known to make such plates from dynamo sheet iron by a cutting or stamping process, known per se.

In order to make the production of the stator and rotor plates economical, the cutting or stamping presses are fitted with devices for automatically feeding in the sheets and for removing the produced workpieces, respectively. With a view to satisfying the required high operating speeds, a consecutive cutting or stamping system is used.

In a hitherto known manufacturing method, for example, a strip of dynamo-sheet material is rectilinearly introduced or conveyed into the cutting or stamping press by way of a feeding device, operating with cylinders or clamps. The stamping press has several stamping units or positions. The strip is so dimensioned that it also serves as a means for its advancement. The stamping steps are performed successively, the completed workpiece being separated from the dynamo-sheet strip with the last operating step. The workpieces then fall through a cutting plate of the last stamping unit onto a catching or supporting mandrel.

This manufacturing method requires a substantial amount of material and produces substantial waste because the strip-shaded material cannot be economically exploited. In order to improve the degree of material utilization, it has also been suggested to cut or stamp out the individual workpieces in a staggered cutting set-up, and to stamp them out to the final outer contours or diameters; subsequent operating cycles are performed individually on several presses.

A feeding system or device for the workpieces to be processed in the plural presses consists of a storage magazine and a so-called singling device from where each workpiece reaches the receiving position of the press owing to its own weight. After the stamping or cutting the workpieces simply drop out from the last press or press unit.

The completion of the stator and rotor plates illustrated and described in the present application would require four presses if using the above-mentioned known manufacturing method. Consequently, the operating speed is determined by the free fall of the workpieces handled by the press, which is unsatisfactorily low.

Stepwise or continuously operating presses are also known, for example, with stamping tables which, however, are unsuitable for cutting or stamping stator and rotor plates because of their very low operating speeds.

It is an object of the present invention to avoid the disadvantages of hitherto known methods and devices, and to provide a device which allows both stator and rotor plates to be produced economically and with high speed.

It is another object of the invention to provide a process and a device for making stator and rotor plates for electric motors of limited size, the individual workpieces being initially produced in a staggered cutting or stamping system to final outer dimensions, the transportation to the inventive device being automatically performed according to a predetermined working rhythm. With a relatively modest technical equipment, highest economical results can be obtained.

According to one of the important features of the invention, the raw workpieces are pre-formed to the diameter of the stator plates to be stamped out. The workpieces are stacked in a feeding or singling device from where they are individually introduced into appropriate grippers of a transporting star system or turret, whereupon they are fed along a circular path to a plurality of stamping or cutting units of a combined stamping device or press. With a single action, both the rotor and the stator plates are cut out, together with their notches or grooves, in he various units of the press; finally, the finished plates are taken up by collecting or stacking pins.

According to another inventive feature, the operations are performed on the workpieces in three or more consecutive cycles or phases, such as cutting out the notches of the rotor plates, cutting out the rotor plates themselves, and cutting out the notches of the stator plates. The sequence, it should be understood, may be different, and there may be more or less operational phases, preferably all carried out simultaneously in the same stamping device. The rotor plates are stacked separately from the stator plates.

According to the invention, the device for making stator and rotor plates comprises a number of cutting or stamping units, known per se, in a kind of circular assembly line, the units being coordinated and properly synchronized by means of conventional driving and control elements.

According to yet another inventive feature, the portion of the device which advances the raw and partly stamped workpieces along a circular path has a plurality of grippers and a preferably centralized clamping device for securing each workpiece and for subsequently releasing them. A push-rod actuated mechanism is provided for operating the grippers which are secured to the transporting turret.

Still another feature of the invention relates to the provision of centering or catching pins or mandrels, for registering the workpieces before and during their processing. These pins may be provided peripherally or internally, e.g. for engagement with already stamped holes of the plates.

The inventive process and device ensures maximum exploitation of the dynamo-sheet or other material so that high operating speeds can be obtained on presses with relatively low or modest technical requirements.

The various objects, features and attendant advantages of the present invention will become more apparent from the following description of a preferred exemplary embodiment of the device, when considered in conjunction with the accompanying drawings, wherein FIG. 1 is a somewhat schematic top view of a preferred embodiment of the device according to the invention for making stator and rotor plates of electromotors;

FIG. 3 is another sectional view taken along line 3—3 of FIG. 1;

Figure 2:
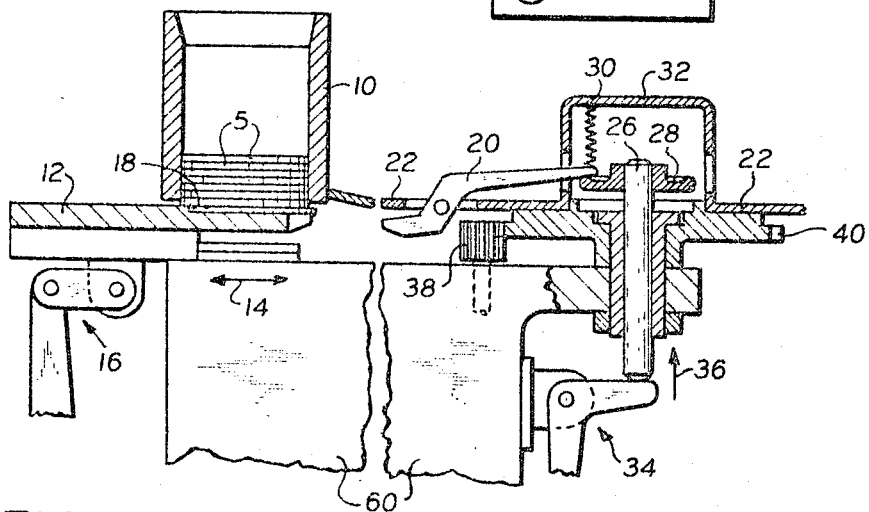
FIG. 2 is a sectional view taken along line 2—2 of FIG. 1.
Figure 7:
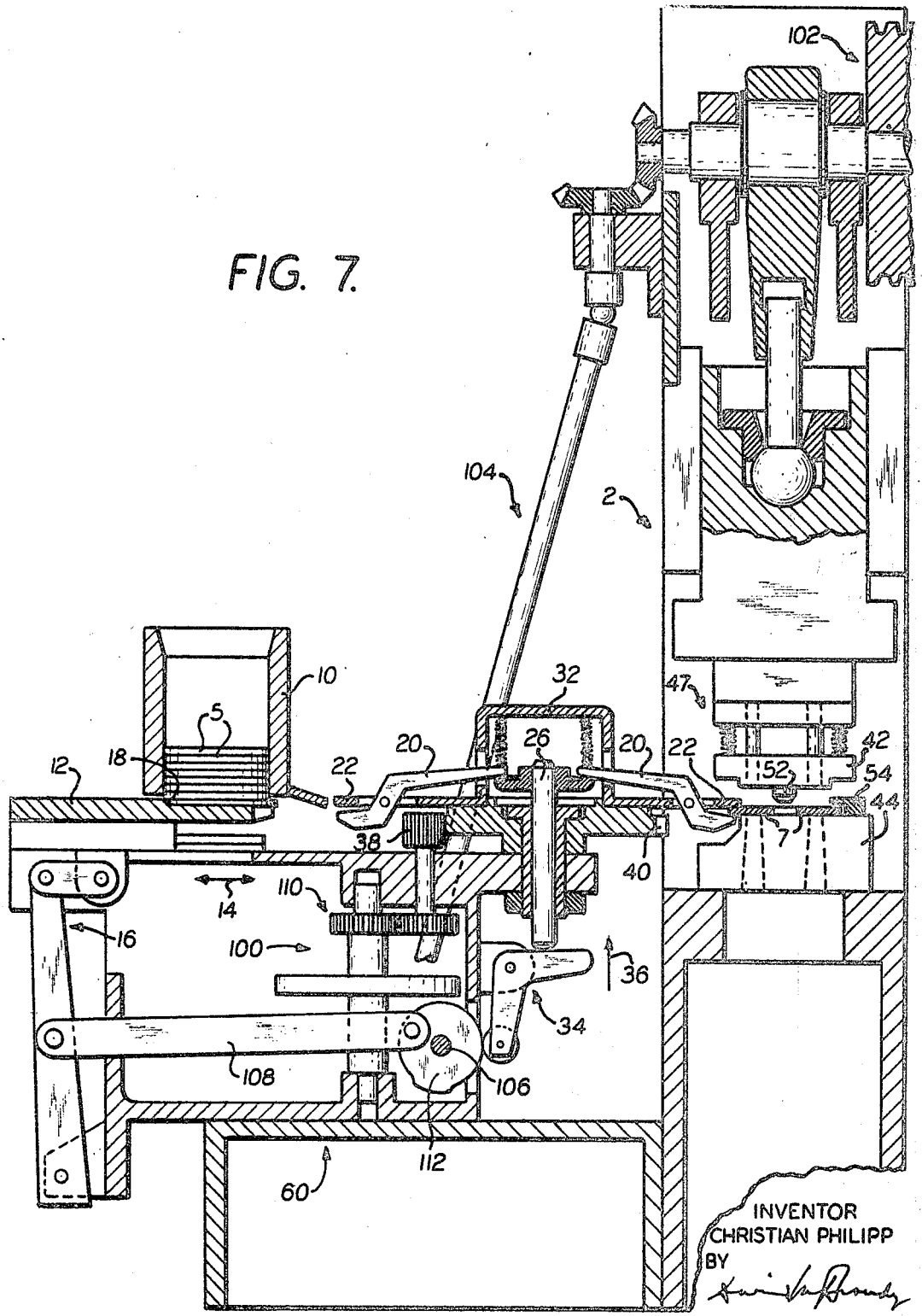

FIGS. 6a through 6f represent subsequent phases which illustrate the starting dynamo-sheet material, the same material after a number of raw workpieces have been stamped out in a staggered arrangement, a single workpiece before processing in the inventive device, a semi-finished, stamped plated displaying the rotor-plate notches, a similar plate in which the stator-plate notches have also been stamped out, and finally a pair of stator and rotor plates, upon having separated the preceding plate along a circular line, respectively; and FIG. 7 is a somewhat schematic, partly sectional view constituting a combination of FIGS. 2 and 3, and also showing a central control mechanism for coordinating the operation of the feeding, transporting, conveying and punching mechanisms of the inventive device.

The device for making stator and rotor plates, according to the present invention, is generally designated by numeral 1 (see FIG. 1), while a combined stamping or punching device is shown at 2. Before describing the structure and operation of the inventive device, it should be pointed out that a dynamo-sheet plate or strip 3 of any commercial size is used as a starting material, from which workpieces 5 are cut out in a conventional press (not illustrated). The cut out plate is shown at 4 as having holes 41 where the workpieces 5 have been removed. The subsequent stages of the starting material, workpiece, and subsequent plate elements are illustrated in respective FIGS. 6a through 6f, some of which (FIGS. 6d through 6f) will be described somewhat later. It can be seen from FIG. 6b that a staggered set-up is used so as to economize the material 3 as far as possible in stamping out a maximum number of workpieces 5. The latter correspond in their outer diameter to that of the stator plates 8 to be produced, while the rotor plates 9 are accommodated within the stator plates 8 (before being cut apart).

In the device 1, the workpieces 5 are manually or otherwise inserted into a chute or funnel 10 of a feeding or singling device from where the workpieces individually reach a reciprocable slide 12 which is actuated by conventional means to move in the direction of the arrow 14. A toggle-lever system 16 or similar conventional mechanism may be used for reciprocating the slide 12. An exemplary mechanism will be described somewhat later, with reference to FIG. 7, as part of a central control mechanism. The forward end of the latter is profiled to the shape of the workpieces 5 and recessed, as shown at 18, for taking up one workpiece at a time from the chute 10.

When the slide 12 is in itself its farthest most extended position, the workpiece 5 in its recess 18 reaches one of the grippers 20 pivotably attached to a transporting star or turret 22 which is rotated by conventional means (see later the description of FIG. 7) in the direction of the arrow 24, by stepwise increments corresponding to the angular distance between stamping positions provided in the device 2, as will be explained later in more detail. In the exemplary embodiment described and illustrated herein, the turret 22 has eight grippers 20 of which one faces the chute 10 of the singling device, three are in registering relation with respective stamping units of the device 2, and one gripper subsequent to the last stamping unit is above the means for depositing the stator plates 8 (also shown in FIG. 5); the remaining three intermediate grippers do not face any particular operative part of the device. It should be noted that the advancing movement of the turret 22 is preferably synchronized with the actuation of the stamping device 2, as will be explained in more detail with reference to FIG. 7.

Figures 4, 5:
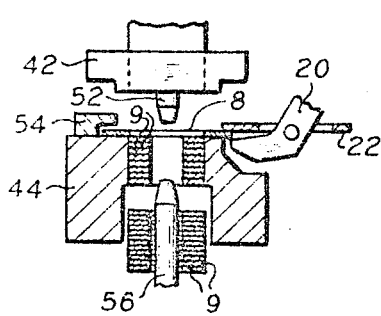
FIG. 4 is a partial sectional view taken along line 4—4 of FIG. 1.
FIG. 5 is another partial sectional view taken along line 5—5 of FIG. 1.

A plunger 26 is centrally located underneath the turret 22, for raising a plate member 28 on which rest the inner ends of the grippers 20 which are urged into engagement with the plate 28 by means of compression springs 30, bearing against a raised, central portion of the turret 22, denoted 32. A linkage 34 is provided for raising the plunger 26, together with the plate member 28, against the action of springs 30, in the direction of the arrow 36 (FIG. 2). For the operation of the linkage 34, see FIG. 7. In the raised position, the grippers 20 are spaced apart from the peripheral portions of the turret 22 by more than the thickness of a workpiece 5. In contradistinction, when the plunger 26 is allowed to descend, the springs 30 push the grippers down at their inner ends so that the outer, clamp-shaped ends are adapted to engage a workpiece and press the same against the underface of the turret. In FIGS. 2 and 3, the grippers 20 are shown disengaged because the plunger 26 is raised; FIG. 5 illustrates the clamped condition of the already stamped out stator plate 8.

The respective actuating mechanisms 16 and 34 (shown in FIGS. 2 and 7; more reference will be had to the latter as the description proceeds) for the slide 12 and the grippers 20 are co-ordinated so that for each forward movement of the slide 12, the grippers 20 are opened or released so that a new workpiece 5 may be seized at the feed-in side of the device; subsequently, and during the stepwise movement of the turret 22, the grippers are closed or engaged. The workpieces 5, and later on the partly or completely stamped plate 6, 7 and 8 are advanced by the grippers during this stepwise movement.

Any conventional means may be provided for the rotational movement of the turret 22, such as a gear 38 driven by a motor or other motive power, and engaging a spur gear 40 supporting the turret 22 and rigid therewith. The diametral ratios of the gears 38, 40 will provide relatively slow rotation of the turret 22 while the driving gear 38 (and its motor) revolve at a much faster speed. For more details, reference should again be had to FIG. 7 and its description.

Figure 1:
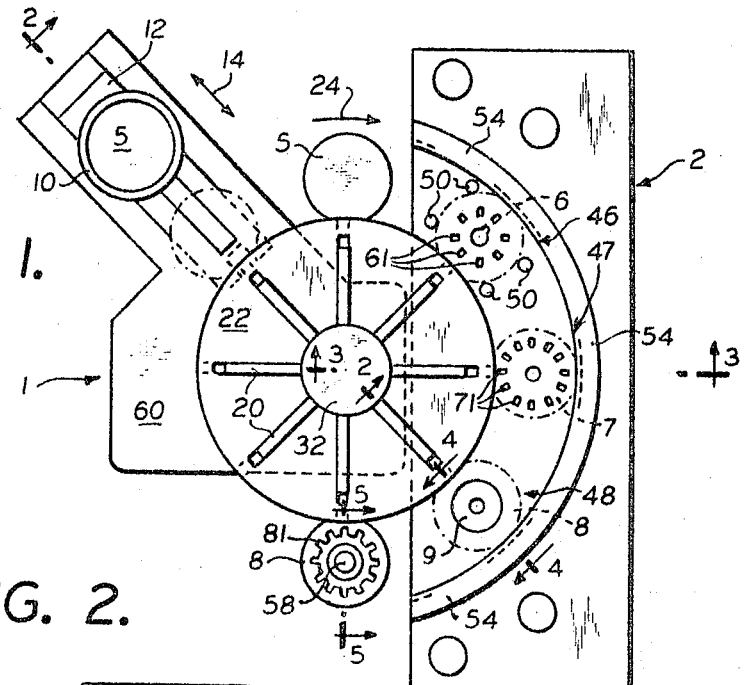

The combined stamping device 2 (FIG. 1) includes the conventional upper and lower dies or tools 42 and 44, respectively (shown in FIG. 3 only), for each of a number of stamping or punching units, denoted 46, 47 and 48 (see FIG. 1). While three such units have been shown and will be described, the inventive device for making stator and rotor plates may have a larger or smaller number of such units.

The individual workpieces 5 are advanced by the transport star 22, each workpiece held by a gripper 20, along the cutting or stamping units 46, 47 and 48. Each workpiece is processed three times: first, by cutting out from the starting workpiece 5 notches 61, thus constituting intermediate plates 6 (the notches 61 will later become notches 91 of the rotor plates 9); second, by additionally cutting out from the intermediate plate 6 notches 71, thus constituting combined plates 7 (the notches 71 will later become notches 81 of the stator plate 8); and third, by subsequently separating the rotor plates 9 from the stator plates 8 by punching out the combined plates 7. These steps are performed with the respective units 46, 47 and 48; in the first unit 46, the central apertures 92 of the rotor plates are also punched or cut out from the starting workpieces or plates 5. The consecutive phases are clearly illustrated in the FIGS. 6d through 6f.

The upper tool 42 may have recessed cutting members and conventional springs for urging the lower face against the workpiece to be stamped. Also, conventional channels or chutes may be provided for the removed material chips, as illustrated in FIG. 3. The leverage for operating the stamping device 2 has not been shown in FIGS. 1 to 3; it will be understood that this, too, is co-ordinated with the turret rotation and the gripper clamping, as well as with the feed-in action of the singling mechanism. This can be seen in FIG. 7.

Once a new workpiece 5 is brought to the unit 46 by one of the grippers 20 and released thereat, it has to be centered under the tool 42. To this end, catching or centering pins 50 are provided in unit 46 which move into the plane of the workpiece 5 once it has been brought to that working position. Perfect centering is thus ensured while the tools perform the cutting or punching operation of notches 61 and aperture 92. At the subsequent working positions, the latter serves as a centering means so that peripheral catching pins are not required for the units 47 and 48.

When the workpiece 5 has been processed in unit 46, it is actually turned into the intermediate plate 6 which is further processed in unit 48. Conversely, upon having performed the stamping operation in the latter, we are dealing with the combined plate 7, to be advanced to the last unit 48, where it is separated into the finished stator and rotor plates 8 and 9, respectively. The centering at the units 47 and 48 is accomplished by way of respective centering pins 52 which are brought down into the aperture 92 of the partly stamped plates 6 and 7, respectively. These pins engage the plate apertures just before the cutting step takes place. During this adjustment or centering, the workpieces 5 as well as the plates 6 and 7 are released by the grippers 20, upon co-ordinated actuation of the plunger 26.

Along the stamping units 46, 47 and 48 of the device 2, there is an arculate ledge 54 against which the workpieces 5 and the plates 6, 7 may abut when properly positioned or centered. The ledge 54 is secured to the lower tool portion 44 and also serves to move the spring-biased lower plate of the upper tool portion 42 away from the plate to be processed. The inner recess of the ledge 54 safely accommodates the innermost edges of the workpieces and the plates (5, 6 and 7, respectively).

While FIGS. 1 and 2 illustrate the feed-in of the workpieces 5, and FIGS. 1 and 3 one of the cutting or punching operations during the processing, FIGS. 4 and 5 show the storing or stacking of the rotor plates 9 and the stator plates 8, respectively. The cut-out rotor plates 9 are deposited, at the unit 48, through the lower tool 44 of the device, onto a mandrel 56. The stator plates 8 are advanced by one more step, to a position subsequent to the unit 48, where they are released by the grippers 20 so as to drop onto another mandrel 58, correspondingly larger than the afore-mentioned mandrel 56. The removal of the rotor and the stator plates from the respective mandrel may be done manually or by appropriate mechanical means (not illustrated). In FIGS. 1 and 5, the supporting structure for the mandrel 58, and in FIG. 4 similar conventional mechanical elements adjacent the lower tool portion 44 and the mandrel 56 have been omitted for the sake of clarity.

The device 1 includes a conventional housing 60 in which are lodged the drive means for the gear 38 (for rotating the turret 22), and other drive and control elements for the co-ordinated operations. Such control elements may comprise hydraulic, mechanical, electrical or combined means for (a) rotating the turret step by step between each punching or stamping operation, (b) releasing the grippers while the turret is at a stop and engaging them shortly before and during its stepwise rotation, (c) reciprocating the feed-in plunger once for each cycle of the turret rotation, just before the grippers close, and (d) operating the stamping device (with its simultaneously working plural units) while the turret is at a stop and the grippers are released.

FIG. 7 illustrates a central control mechanism for co-ordinating the operation of the feeding, transporting, conveying and punching mechanisms, is a somewhat schematic, partly sectional view including the details of both FIGS. 2 and 3. The control mechanism is generally designated by numeral 100 and includes some of the structural elements already described.

The foregoing disclosure relates only to a preferred, exemplary embodiment of the invention, which is intended to include all changes and modifications of the example described within the scopeof the invention.

In a conventional manner, the main power drive may be applied to the stamping or punching device 2 which is illustrated, as a matter of example, with a belt pulley or wheel 102 from which the central control mechanism may also be driven although a separate motor may be provided for the turret driving gear 38, as mentioned before. A linkage 104 is shown as an exemplary means of connecting the main drive of the device 2 with the control mechanism 100.

The control mechanism is shown to include a shaft 106 which may be connected with the afore-mentioned linkage 104 by way of a worm gear or other conventional means, or it may be individually driven. An eccentric linkage 108 is shown, as a matter of example, for the actuation of the toggle-lever system 16 and thus the reciprocation of the slide 12.

A conventional gearing is shown at 110 on a shaft which may be correlated with the afore-mentioned shaft 106, for rotating the gear 38 that serves for the rotation of the turret 22. Conventional means (not shown) are interposed for providing the earlier described stepwise movement of the turret, corresponding to the angular distances between the individual stamping positions. The provision of the linkage 104 of course provides the necessary synchronization with the operation of the stamping device 2.

Shaft 106, or any other driven element of the central control mechanism, may carry a cam disk as shown at 112 for actuating a follower or the like member attached to the linkage 34 which in turn opens and recloses the grippers 20 on the turret 22. The cam shape is arbitrary and has not been selected to indicate a specific correlation with the other operative elements, such as the afore-mentioned linkage 108. It will be understood that other mechanical expedients may also be used for the same purposes as explained above.

It will be understood that by the provision of the central control mechanism, the respective actuating mechanisms 16 and 34 are coordinated by way of the control elements 108 and 112, respectively, so that for each forward movement of the slide 12, the grippers 20 are opened and released; subsequently, and during the stepwise movement of the turret 22, obtained by the intermediary of the co-operating control elements 104, 106 and 110, the grippers are closed or engaged.

It is important to note that the grippers 20 are always opened and closed again while the turret 22 is at a standstill; similarly, it is imperative that the turret be rotated step by step between each stamping operation, that the slide 12 be reciprocated once for each cycle of the turret rotation, just before the grippers 20 close, and finally that the stamping device 2 is also operated while the turret 22 is at a stop and the grippers are released.

What I claim is:

1. A process for making stator and rotor plates for electromotors of limited size, comprising the steps of stacking previously punched-out circular starting workpieces in a feeding device, the workpieces having the diameter of the stator plates to be produced, individually introducing the workpieces into rotary transporting means, feeding the starting and the partly punched intermediate workpieces with the transporting means along a circular path to simultaneously operated punching units of a combined punching device, punching in the workpieces different notches and apertures for the stator and the rotor plates, including the separation of the intermediate workpieces into finished stator and rotor plaes, and taking up the finished plates by stacking means, wherein the punching step includes separate but simultaneous punching of the notches for the stator and the rotor plates in respective first and second punching units, with separate but simultaneous separation of the intermediate workpieces in a third punching unit, the starting and the intermediate workpieces being successively and simultaneously fed to the respective punching units.

2. The process for making stator and rotor plates as defined in claim 1, wherein the stacking of the rotor plates is performed simultaneously with the separation of the intermediate workpieces, while the stacking of the stator plates is performed at a subsequent operational position.

3. The process for making stator and rotor plates as defined in claim 1, wherein the punching of the respective notches in the stator and rotor plates is performed along contiguous circles, while the separation of the intermediate workpieces is carried out along the demarcation line common to the respective stator and rotor notches, whereby the finished stator plates have inwardly directed open notches and the finished rotor plates have outwardly directed open notches.

4. The process for making stator and rotor plates as defined in claim 1, wherein the feeding of the workpieces includes their simultaneous gripping and holding while transporting them to, between and from the punching units, the gripping being released only for the relatively short duration of the punching and separating steps.

5. The process for making stator and rotor plates as defined in claim 4, wherein the workpieces are allowed to rest on respective lower tool portions of the punching units for the short duration while the gripping of the workpieces is released.

6. The process for making stator and rotor plates as defined in claim 1, further comprising the step of centering the workpieces during the punching and separating steps by pins disposed in respective upper tool portions of the punching units.

7. A device for making stator and rotor plates for electromotors of limited size, comprising, in combination, stacking means for previously punched-out circular starting workpieces having the diameter of the stator plates to be produced, feed means for individually introducing the workpieces into rotary transporting means, conveying means for carrying the starting and the partly punched intermediate workpieces along a circular path to consecutive operational positions, combined punching means including a separate punching unit at each operational position, and means for taking up the finish stator and rotor plates, wherein the transporting means includes a substantially circular turret including individually pivotable grippers for the workpieces, and a central control mechanism for simultaneously and selectively opening and closing the grippers while the transporting means is at a standstill, the control mechanism including a reciprocable plunger centrally journaled in the turret, a plate member secured to the upper end of the plunger, and biasing means for depressing the plate member, the inner ends of the grippers being acted upon by both the plate member and the biasing means for selectively holding and releasing the workpieces upon actuation of the plunger.

8. The device for making stator and rotor plates as defined in claim 7, further comprising control means for coordinating the operation of the feed means, the transporting means, the conveying means and the punching means so that the feed means and the punching means operate for the short duration while the transporting means is at the standstill.

9. The device for making stator and rotor plates as defined in claim 7, wherein at least one punching unit has at least one centering pin for positioning the workpieces before the punching units are operated.

10. The device for making stator and rotor plates as defined in claim 9, wherein the centering pins engage the workpieces laterally after the latter are conveyed to the punching units by the transporting means.

11. The device for making stator and rotor plates as defined in claim 9, wherein the centering pins are centrally disposed in respective upper tool portions of the punching units for engaging previously punched apertures in the workpieces.

12. The device for making stator and rotor plates as defined in claim 7, wherein the operational positions are adapted for punching notches in both the stator and the rotor plates and for separating the intermediate workpieces into finish stator and rotor plates, the operational position for the separation coinciding with that for taking up the rotor plates.

13. The device for making stator and rotor plates as defined in claim 12, wherein the punching of the respective notches in the stator and rotor plates is performed along contiguous circles, while the separation of the intermediate workpieces is carried out along a demarcation line common to the respective stator and rotor notches, whereby the finished stator plates have inwardly directed open notches and the finished rotor plates have outwardly directed open notches.

14. The device for making stator and rotor plates as defined in claim 7, wherein the punching units have respective upper and lower tool portions, the latter serving as supports for the workpieces for the short duration while their gripping is released and the punching units are operated.

References Cited
UNITED STATES PATENTS

| | | | |
|---|---|---|---|
| 1,778,824 | 10/1930 | Crane | 83—277 X |
| 2,281,439 | 4/1942 | Heftler | 83—95 X |
| 2,433,533 | 12/1947 | Sheng | 83—467 X |
| 2,437,994 | 3/1948 | Beyer | 84—411 X |
| 2,968,913 | 1/1961 | Onulak | 221—225 X |
| 2,994,458 | 8/1961 | Rise et al. | 221—255 X |
| 3,127,804 | 4/1964 | Bufalino | 83—417 X |

ANDREW R. JUHASZ, Primary Examiner

U.S. Cl. X.R.

10—166, 72; 83—32, 41, 95, 267, 277, 441, 417; 221—219, 224; 269—57